United States Patent
Dovetta et al.

(10) Patent No.: US 12,344,977 B2
(45) Date of Patent: *Jul. 1, 2025

(54) METHOD FOR PREPARING AN INSULATING PRODUCT BASED ON WOOL, IN PARTICULAR MINERAL WOOL

(71) Applicant: SAINT-GOBAIN ISOVER, Courbevoie (FR)

(72) Inventors: Nicolas Dovetta, Bourg la reine (FR); Mathilde Siband, Paris (FR); Foucault De Francqueville, Issy les Moulineaux (FR)

(73) Assignee: SAINT-GOBAIN ISOVER, Courbevoie (FR)

( * ) Notice: Subject to any disclaimer, the term of this patent is extended or adjusted under 35 U.S.C. 154(b) by 17 days.

This patent is subject to a terminal disclaimer.

(21) Appl. No.: 18/046,241

(22) Filed: Oct. 13, 2022

(65) Prior Publication Data

US 2023/0123336 A1 Apr. 20, 2023

Related U.S. Application Data

(63) Continuation of application No. 16/066,740, filed as application No. PCT/FR2016/053662 on Dec. 23, 2016, now Pat. No. 11,542,643.

(30) Foreign Application Priority Data

Dec. 29, 2015 (FR) ...................................... 1563437

(51) Int. Cl.
*B01F 23/30* (2022.01)
*B01F 25/10* (2022.01)
(Continued)

(52) U.S. Cl.
CPC ........... *D04H 1/732* (2013.01); *B05B 7/1409* (2013.01); *D01G 9/00* (2013.01); *D01G 9/08* (2013.01);
(Continued)

(58) Field of Classification Search
CPC .......... B01F 23/30; B01F 25/10; B01F 25/20; B01F 25/25; B01F 25/27; B01F 25/28;
(Continued)

(56) References Cited

U.S. PATENT DOCUMENTS

| 7,360,719 | B1 | 4/2008 | Emmons |
| 11,542,643 | B2 * | 1/2023 | Dovetta ................. E04F 21/12 |

(Continued)

FOREIGN PATENT DOCUMENTS

JP 2006-97203 A 4/2006

OTHER PUBLICATIONS

International Search Report issued Feb. 28, 2017, in PCT/FR2016/053662, filed Dec. 23, 2016.

*Primary Examiner* — Michael A Tolin
(74) *Attorney, Agent, or Firm* — Oblon, McClelland, Maier & Neustadt, L.L.P.

(57) ABSTRACT

A method for preparing an insulating product based on wool includes an aeration step inside a device, the device including a chamber and at least one structure capable of generating a turbulent gaseous flow, during the aeration step. A stream of carrier gas is introduced into the chamber and a wool in the form of nodules or flakes is subjected to the turbulent flow of this carrier gas with entrainment in one sense in a direction A and in the opposite sense in a direction B that is the opposite to the direction A so that within the chamber there is at least in one plane perpendicular to the direction A in which the wool entrained in the direction A crosses the wool entrained in the direction B.

20 Claims, 3 Drawing Sheets

(51) Int. Cl.
  *B01F 25/20* (2022.01)
  *B05B 7/14* (2006.01)
  *B65G 53/16* (2006.01)
  *D01G 9/00* (2006.01)
  *D01G 9/08* (2006.01)
  *D01G 9/14* (2006.01)
  *D04H 1/4209* (2012.01)
  *D04H 1/4226* (2012.01)
  *D04H 1/732* (2012.01)
  *E04B 1/76* (2006.01)
  *E04F 21/08* (2006.01)
  *E04F 21/12* (2006.01)
  *F16L 59/00* (2006.01)
  *E04B 1/84* (2006.01)

(52) U.S. Cl.
  CPC ............ *D01G 9/14* (2013.01); *D04H 1/4209* (2013.01); *D04H 1/4226* (2013.01); *E04B 1/7604* (2013.01); *E04F 21/085* (2013.01); *E04F 21/12* (2013.01); *F16L 59/00* (2013.01); *B01F 23/30* (2022.01); *B01F 25/10* (2022.01); *B01F 25/20* (2022.01); *B65G 53/16* (2013.01); *D10B 2101/06* (2013.01); *D10B 2101/08* (2013.01); *E04B 1/84* (2013.01)

(58) Field of Classification Search
  CPC ... B05B 7/1404; B05B 7/1409; B05B 7/1413; B05B 7/145; B29C 67/248; B29C 67/249; B65G 53/16; D01G 9/00; D01G 9/08; D01G 9/14; D04H 1/4209; D04H 1/4218; D04H 1/4226; D04H 1/732; D10B 2101/06; D10B 2101/08; E04B 1/7604; E04B 1/84; E04F 21/06; E04F 21/08; E04F 21/085; E04F 21/12; F16L 59/00
  See application file for complete search history.

(56) References Cited

U.S. PATENT DOCUMENTS

| | | |
|---|---|---|
| 2006/0266429 A1 | 11/2006 | Wagner et al. |
| 2013/0221567 A1 | 8/2013 | Jorgensen et al. |
| 2017/0175945 A1 | 6/2017 | Shumate |

* cited by examiner

METHOD FOR PREPARING AN INSULATING PRODUCT BASED ON WOOL, IN PARTICULAR MINERAL WOOL

CROSS REFERENCE TO RELATED APPLICATIONS

This application is a Continuation of U.S. patent application Ser. No. 16/066,740, now U.S. Pat. No. 11,542,643, which is a 371 of PCT/FR2016/053662, filed Dec. 23, 2016; the entire contents of each of which are hereby incorporated by reference.

BACKGROUND OF THE INVENTION

The invention relates to a method for preparing an insulating product comprising wool, preferably mineral wool, to a device allowing preparation of an insulating product, to an insulating product and to a method of thermal insulation.

Mineral wool is a very good thermal and sound insulator because it comprises entangled mineral fibers which give it a porous and elastic structure. Such a structure allows air to be trapped and noise to be absorbed or damped. Furthermore, mineral wool is manufactured essentially from mineral materials, notably natural materials or recycled products (recycled glass) and is thus attractive from an environmental balance standpoint. Finally, because mineral wool is based on materials which are by nature non-combustible, it does not feed fire or spread flames. For preference, the mineral wool is selected from glass wool and rock wool.

A distinction is made between, on the one hand, insulating products of the panel or roll type which come in the form of sheets or mats of fibers, the cohesion of which is ensured by a binder (also referred to as size) which binds the fibers together by discrete point adhesion, and, on the other hand, products of the loose-fill type which take the form of small bundles of entangled fibers that form particles on a centimeter scale, in which no binding agent ensures the cohesion of the fibers in the bundles.

BRIEF SUMMARY OF THE INVENTION

The manufacture of loose-fill mineral wool comprises at least the following steps:
 a step of melting the raw materials such as glass, in a melting furnace,
 a fiberizing step,
 a step of forming a mat of mineral wool,
 a step of nodulation using grinding.

BRIEF DESCRIPTION OF THE SEVERAL VIEWS OF THE DRAWING

Aspects of the disclosure are presented in the attached drawings.

Figure 1A:
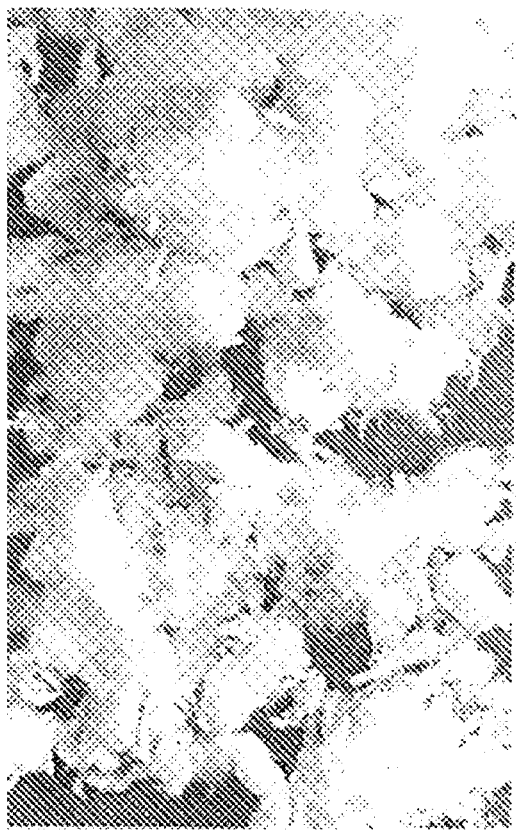
FIG. 1A is a photograph of a glass wool in the form of nodules or flakes that have not undergone the aeration according to the invention.

The manufacture of loose-fill mineral wool may further comprise the following steps:
 a step of coating with agents such as antistatic agents and/or a cohesion additive, prior to, at the same time as, or following nodulation, and/or
 a bagging step.

At the end of the nodulation step, the mineral wool is in the form of nodules or flakes. The mineral wool may then be used as such as a loose-fill insulating product or as loose fill insulation, by spreading it, blowing it, or filling cavities with it. A loose-fill insulation corresponds, in the field of building, to a variety of materials offered in the form of small particles the texture of which varies from granular to flake-like.

The mineral wool is advantageously used in the form of nodules or flakes as a main component in loose-fill insulation products for spaces that are difficult to access such as the floors of roof spaces not suitable for conversion which have not been developed or which are difficult to access.

These loose-fill insulating products are generally applied by mechanical blowing using a blowing machine which allows an insulating product to be sprayed over a surface or injected into a cavity from an outlet pipe.

These loose-fill insulating products are therefore mainly installed by spraying them directly into the space that is to be insulated, such as the roof space, or by injecting them into a wall cavity.

Loose-fill insulating products are also referred to as blown insulation.

The insulating product once blown in needs to be as homogeneous as possible to avoid thermal bridging and thus improve the thermal performance. However, when the insulating product is blown in, whatever the diameter of the outlet pipe, the mineral wool in the form of nodules or flakes is not entirely homogeneous. The thermal conductivity of the resulting insulating product is not optimized.

A number of solutions have been considered for improving the homogeneity of loose-fill insulating products along their pneumatic journey.

Patent Applications EP1165998 and US 2006/0266429 disclose flexible pipes which have mechanical means allowing the loose-fill insulation to be expanded as it is being installed. These mechanical means are projections extending over the internal surface of the pipes.

Application JP 2006/328609 discloses a complex method for expanding rock wool before storing it in a silo, comprising a step whereby agglomerates of fibers are carried by a turbulent airflow qualified by a Reynolds number of higher than 200000, inside a duct provided with several series of needles and of zones in relief so that the agglomerates colliding therewith undergo mechanical opening.

These solutions, which are often excessively complex, are not entirely satisfactory.

The applicant has developed a new preparation method that makes it possible to obtain an insulating product comprising wool, preferably mineral wool, that has improved thermal performance.

The method of the invention for preparing a wool-based insulating product comprises an aeration step inside a device comprising a chamber and at least one means capable of generating a turbulent gaseous flow. During this aeration step, a stream of carrier gas is introduced into the chamber and a wool in the form of nodules or flakes is subjected to the turbulent flow of this carrier gas with entrainment in one sense in a direction A, and in the opposite sense in a direction B that is the opposite to the direction A so that within the chamber there is at least one plane perpendicular to the direction A in which the wool entrained in the direction A crosses the wool entrained in the direction B.

The profile of the mean speeds of the mineral wool in the flow in the direction A comprises at least one recirculation point or zone at which the component of speed parallel to the direction A is negative, making it possible to generate the flow in the direction B. For preference, there are several recirculation points, so that one or more recirculation loops or bubbles is formed in the flow.

It will be noted that the method of the invention uses a turbulent flow in the unsteady state. The explanations given in the present application with regard to the speed profiles of the flows relate to the time-averaged speeds averaged over a duration that is long in comparison with that of the fluctuations.

The wool is preferably a mineral wool, in particular chosen from glass wool or rock wool.

Glass wool is generally defined as being a product obtained from a molten mineral material derived from a mixture of vitrifiable raw materials and converted into a fiber by a method that is usually centrifugal spinning. Melting glass to a relatively viscous liquid form produces fibers that are relatively long and fine.

Rock wool is generally defined as being a product obtained from a molten mineral material derived from natural rocks and converted into a fiber by a method involving a series of rotating wheels. The melting of natural rock into the form of a highly fluid liquid produces fibers that are relatively short and thick.

The aeration step significantly decreases the density of the wool, preferably mineral wool, in the form of nodules or flakes but above all homogenizes the structure thereof. Surprisingly, the expansion and/or homogenization of the wool subjected to the aeration step of the invention is far better than that which can be obtained by the known methods of homogenization. The resulting insulating product can be compacted after the aeration step while maintaining a more homogeneous structure.

The improvement in thermal performance is manifested in particular, in relation to mineral wools not aerated according to the method of the invention, in a reduction in the thermal conductivity for the same density or in a reduction in the density for the same thermal conductivity. The resulting insulating products also, for the same density, have a far higher airflow resistance.

The method of the invention makes it possible to expand the nodules or flakes so that it becomes practically impossible to determine the individual dimensions thereof. That can be demonstrated by a simple visual examination of the insulating products.

Figure 1B:
FIG. 1B is a photograph of a glass wool in the form of down having undergone the aeration according to the invention.

FIG. 1 comprises photographs respectively depicting:

FIG. 1A: a glass wool in the form of nodules or flakes that have not undergone the aeration step according to the invention and FIG. 1B: a glass wool in the form of down having undergone the aeration step according to the invention.

Figures 2A, 2B:
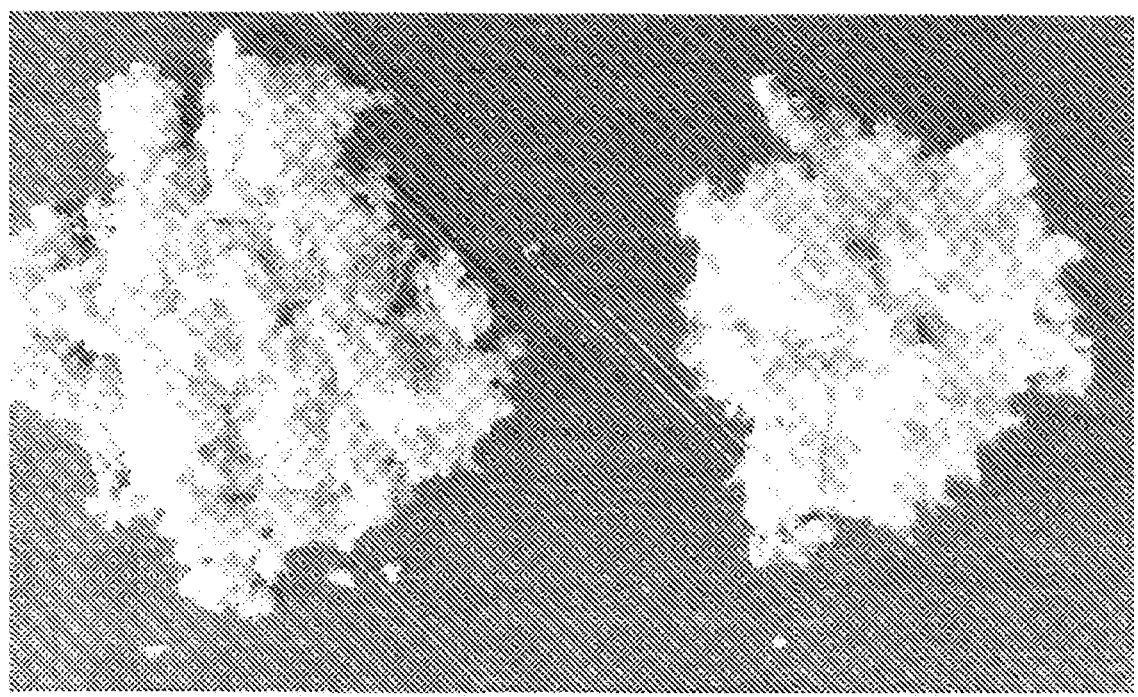
FIG. 2A is a photograph of a rock wool in the form of nodules or flakes that has not undergone the aeration step according to the invention.
FIG. 2B is a photograph of an "expanded" rock wool in the form of nodules or flakes.

FIG. 2 comprises photographs respectively depicting:

FIG. 2A: a rock wool in the form of nodules or flakes that has not undergone the aeration step according to the invention, and FIG. 2B: an "expanded" rock wool in the form of nodules or flakes which has undergone the aeration step according to the invention.

The better homogeneity obtained by the method of the invention is clearly apparent from a simple visual examination of the insulating products. Thus, a loose-fill mineral wool obtained according to the invention adopts a novel form, that can be qualified as down, because it is very similar to animal down covering materials. What is therefore meant by "down" in the present application is a loose-fill mineral wool in which the fibers that make up the mineral wool are almost individualized, and the bundled structure of the flakes has been practically destroyed.

Although the method of the invention is quite particularly suitable for mineral wools, in can be applied to any material that can be qualified as a "wool", namely to any material made up of fibers positioned in any way relative to one another and in the form of nodules or flakes.

The wool may be mineral or organic. A mineral wool comprises mineral fibers. An organic wool comprises organic fibers and may be chosen from cotton wool, cellulose wadding wool, wood wool, hemp wool, flax wool, and recycled textile wool.

The invention also relates to a device allowing implementation of the method of the invention. The device allows preparation of an insulating product comprising wool. The device comprises a chamber (in which the aeration step is performed), means of introducing a wool in the form of flakes or nodules into the chamber, at least one means capable of introducing a turbulent gaseous flow into the chamber and of creating within the chamber an entrainment of the wool in one sense in a direction A and in the opposite sense in a direction B that is the opposite to the direction A so that within the chamber there is at least one plane perpendicular to the direction A in which the wool entrained in the direction A crosses the wool entrained in the opposite sense in the direction B.

The invention relates to the insulating product comprising wool, preferably mineral wool, that can be obtained by the method of the invention.

Finally, the invention relates to a method of thermal insulation by spraying or blowing an insulating product directly into the space or onto the surface that is to be insulated or by injecting an insulating product into a cavity, in particular a wall or partition wall cavity, using a device according to the invention.

The preferred features featured in the remainder of the description are just as applicable to the preparation method according to the invention as they are, where appropriate, to the insulating device, product or method.

A turbulent flow exhibits a range of speeds which fluctuate randomly in time and in space. These fluctuations are about a "mean" flow corresponding to a mean over a duration that is long in comparison with that of the fluctuations. According to the invention, what is meant by "turbulent flow" is a flow characterized by a Reynolds number higher than 2000.

A turbulent flow can be defined by a mean speed. The mean speed of the turbulent flow carrying the wool in the direction A corresponds to the flow rate divided by the cross-sectional area of the chamber.

The chamber is configured in such a way that a turbulent set of conditions capable of entraining the wool, preferably mineral wool, in the carrier gas in the opposite sense in a direction B that is the opposite to the direction A becomes established from onwards of a point qualified as the recirculation point. This recirculation point, when the profile of the mean speeds in the flow in the direction A is represented, corresponds to a point at which the component of the speed parallel to the direction A acquires a negative value, thereby making it possible to generate the flow in the direction B (from this point on). In FIG. 1, A and B represent two speed vectors with the same direction and opposite sense. By convention, the speed along the vector A is said to be positive and the speed along the vector B is said to be negative.

The recirculation points create instability which increases the level of turbulence and creates the recirculation movements. Recirculation occurs in a zone in which a quantity "q" of wool, preferably mineral wool, follows the flow in the direction B, namely flows countercurrent to the direction A and follows a looped path.

The presence of recirculation points can be demonstrated by the presence of recirculation bubbles corresponding to closed streamlines of mean (over time) speed. This is not seen in a conventional pneumatic conveyance means in which all of the material always advances in the same mean sense.

A flow in the direction A comprising a recirculation point comprises a shear zone in which the wool travels in the direction A and a recirculation zone in which the wool travels in the direction B.

When representing the profile of the mean speeds in a plane of the chamber perpendicular to the direction A, a shear zone corresponds to a variation in the amplitude of the speed perpendicular to the direction A. Thus, when a flake of wool is situated in such a speed-variation zone, the material of which it is composed will be subjected locally to different entrainment speeds, thereby creating a shear effect.

The shear effect is further amplified if the variation in amplitude is accompanied by a change in sense of the speed vector, as occurs in a recirculation zone. Shear is at a maximum at the recirculation point, which manifests itself as a zero speed changing sense at this point. Beyond the recirculation point, the wool, preferably mineral wool, therefore lies in the recirculation zone. When representing the profile of the speeds of the wool in the flow in the direction A, a recirculation zone is a zone at which the component of the speed parallel to the direction A is negative, something which is characteristic of flow in the opposite sense in the direction B, namely entrainment of the mineral wool in the direction B that is the opposite to the direction A.

The wool, preferably mineral wool, in the shear zone experiences high mechanical stresses which contribute to the "aerating" of the fibers. Passage through the recirculation zone makes it possible considerably to lengthen the time for which the mineral wool is subjected to high levels of shear.

The turbulent flow in the direction A can easily be obtained by entraining the wool using a first air jet. This first air jet, which possibly contains wool in the form of flakes or nodules, enters the chamber from an inlet orifice. This inlet orifice may be an injection nozzle, preferably cylindrical, or an end of an inlet pipe.

The turbulent flow in the direction A is preferably characterized by a Reynolds number higher than 3000, preferably higher than 10000 and better still, higher than 100000. Because of the recirculation profile of the flow, there is no need for the turbulent nature to be particularly pronounced. In this regard, it may seem preferable to keep a Reynolds number below 150000.

The first air jet enters the chamber from an inlet orifice. The flow from a first air jet at the level of the inlet orifice is characterized by a Reynolds number higher than 3000, preferably higher than 10000, and better still, higher than 100000. A first air jet characterized by a Reynolds number higher than 3000 allows the wool, preferably mineral wool, to be entrained and guarantees the turbulent nature of the flow.

The method of the invention, unlike the known systems, chiefly uses a pneumatic or aeraulic system in which a gas, potentially compressed, is used as an aeration means in place of mechanical means in the form of obstacles in the pneumatic conveyor. Any gas whatsoever may be suitable, with the exception of steam. For preference, the gas is air. The first air jet may be created by a compressed-air source.

The method of the invention makes it possible to get around the problem of the wearing of mechanical means. But especially, the known methods using these mechanical means allow the insulating product to be expanded essentially by contact with the mechanical means.

According to the invention, the air jet allows the expansion or expanding of any insulating product subjected to the air jet. As a result, a greater quantity of insulating product can be expanded at the same time. The use of turbulent flows according to the invention contributes to the obtaining of satisfactory speeds of expansion. The speed of expansion corresponds to the mass flow rate of insulating product that can be obtained using the method of the invention.

There are several conceivable possible ways of generating a recirculation point that allows entrainment in a carrier gas in a direction B that is the opposite to the direction A.

According to a first embodiment, the entrainment in a carrier gas in a direction B that is the opposite to the direction A is obtained by choosing suitable features:

for the first air jet, such as the dimensions of the cross section of the inlet orifice and the speed of the injected air, and for the chamber, such as the shape and dimensions of said chamber.

The first air jet may be created by an air injector system equipped at its outlet with a nozzle, preferably cylindrical, opening into the chamber. The nodules or flakes present in the chamber are entrained using the first air jet and forms a turbulent flow in the direction A.

According to this embodiment, the cross section of the inlet orifice corresponding to the cross section of the injection nozzle needs to be small enough in comparison with the cross section of the chamber for the first air jet to be comparable to a turbulent free jet in the "ambient air" of the chamber, which is assumed stationary. The jet is said to be "free" because no wall is supposed to perturb it.

At the "edges" of the jet, there is a high degree of shear (a high tangential stress due to the friction between the layers of fluid). As this high level of shear exists, not in the vicinity of a wall (as is the case inside a cylindrical pipe) but in the vicinity of an immobile gas, the latter can very easily be set in motion. The ambient air is entrained to move, so vortexes are generated at the "edge" of the jet, at the boundary between it and the ambient air. These vortexes entrain within them wool, preferably mineral wool, in the form of nodules or flakes, in the direction B that is the opposite to the direction A.

At the edge of the jet, where the shear is strongest, the turbulent flow in the direction A comprises several recirculation points at which the component of the speed parallel to the direction A is negative and thus allows the flow in the direction B to be generated.

According to this embodiment, the entrainment in a carrier gas in a direction B that is the opposite to the direction A is obtained by choosing a suitable ratio between the dimensions of the cross section of the inlet orifice and a cross section of the chamber in a plane of the chamber perpendicular to the direction A.

The chamber preferably comprises a cross section Se and a length L both perpendicular to the direction A which are such that:
  the dimensions of the cross section Se perpendicular to the direction A are sufficient to generate a recirculation point in a plane of the chamber, and
  the length L perpendicular to the direction A is short enough that the recirculation movements are multiplied.

According to this embodiment, the aeration step inside the chamber is performed for a duration longer than 10 seconds, preferably 30 seconds and better still, 60 seconds.

According to another embodiment, the entrainment in a carrier gas in a direction B that is the opposite of the direction A is obtained by the use of at least one additional air jet for which the direction in which the air is injected is at least partially the opposite to or perpendicular to the direction A.

The additional air jet or jets enter the chamber from inlet orifices, preferably injection nozzles. The flow from an additional air jet at the level of these inlet orifices is characterized by a Reynolds number higher than 3000, preferably higher than 10000, and better still, higher than 100000.

In order to create a recirculation point through the use of additional air jets, it is ideally necessary for the speed of the air leaving the additional air jet to be higher than the mean speed of the flow carrying the wool, preferably mineral wool. These jets generate a region of recirculation when the ratio of speeds between the additional air jet and the first jet exceeds a critical value.

According to this embodiment, the method meets one or more of the following criteria:

- the Reynolds number of the additional air jet is, in increasing order of preference, higher then 3000, higher than 5000, higher than 10000, higher than 10000, and/or
- the Reynolds number of the additional air jet is higher than the Reynolds number of the first air jet carrying the wool in the direction A, and/or
- the speed of the additional air jet is higher than the mean speed of the turbulent flow carrying the wool in the direction A, and/or
- the ratio between the speed of the additional air jet and the mean speed of the turbulent flow carrying the wool in the direction A is greater than 1, preferably greater than 2, and better still, greater than 4.

The mean speed of the turbulent flow which carries the wool, preferably mineral wool, in the direction A is comprised between 0.5 and 50 m/s. In increasing order of preference, the mean speed of the turbulent flow that carries the wool, preferably mineral wool, in the direction A may be comprised between 5 and 40 m/s or between 15 and 35 m/s, or between 20 and 30 m/s, or between 25 and 30 m/s.

The insulating product is homogenized for long enough to allow the appearance of the nodules or flakes to be modified.

The chamber may be part of a duct or of a pipe. In that case, the mean speed of the turbulent flow carrying the mineral wool is at least 10 m/s, in particular at least 20 m/s or around 25 m/s. The part of the pipe that forms the chamber may be delimited by an inlet cross section which may comprise an inlet orifice possibly made in the solid wall, and an outlet cross section which may potentially comprise an outlet orifice made in a solid wall. The aeration zone thus adopts the form of a chamber incorporated into the pipe, with a wall perpendicular to the main direction of the pipe. The aeration chamber may also consist of a simple section of tubular pipe the dimensions (cross section, length) of which determine the formation of recirculation zones.

If the pipe is a blowing pipe, its length may be somewhere around 30 to 50 m, the aeration chamber extending over all or part of the 30 to 50 m. If the length L of the chamber is 30 to 50 m, that means that a quantity "q" of mineral wool spends on average around 1 to 5 seconds in the chamber. When the chamber is part of a duct or of a pipe, the aeration step in the chamber may be performed for a duration of a few seconds, for example more than 1 second, notably more than 3 seconds, for example 5 seconds.

When the chamber forms part of a dedicated device, it may take the form of a chamber or silo with an entry lock, a confined space in which the aeration is performed, and an outlet lock provided with means of opening/closing that can be controlled in accordance with a control program that takes account of preset residence times. For example, in the case of a dedicated chamber having a length of around 1 m, the time that a quantity "q" of mineral wool spends there is around 200 ms. The aeration step inside the chamber is performed for a duration in excess of 200 ms, preferably 0.5 s seconds and better, 1 second.

The aeration step may be performed at any time using a suitable device.

The aeration step may be performed during the manufacture of the wool, preferably mineral wool, in the form of nodules or flakes. In that case, the method for preparing the insulating product comprises at least the following steps:

- a step of melting the raw materials such as glass in a melting furnace,
- a fiberizing step,
- a step of forming a mat of wool, preferably mineral wool,
- a step of nodulation using grinding,
- possibly a step of coating with agents such as antistatic agents and/or a cohesion additive,
- possibly a bagging step.

The aeration step may be performed after the step of nodulation by grinding and before the bagging step. According to an alternative form, the aeration step may be performed after the bagging step.

When the bagging step is performed after the step of nodulation by grinding before the bagging step, the pneumatic conveyor used to carry the glass wool during manufacture may be fitted with a device for aerating the wool before the bagging step.

The aeration step may also be performed before or during the blowing step.

Present-day mineral-wool-blowing machines comprise outlet pipes potentially fitted at their ends with a sleeve that may have an inside diameter that is smaller than the inside diameter of the outlet pipes. The geometry of the assembly constituted by the outlet pipe and the sleeve corresponds to a chamber exhibiting a convergent zone. The mere presence of a convergent zone in a chamber is not liable to create recirculation points.

The Reynolds number that qualifies the flows in present-day mineral-wool-blowing machines is around 200000. The Reynolds number is based on:
the diameter of the pipes, approximately 0.1 m,
the speed of spraying, approximately 20 m/s,
the kinematic viscosity, around $15 \cdot 10^{-6}$ m$^2$/s.

Present-day machines are unable to obtain a turbulent flow having a recirculation point that allows the air and mineral wool to recirculate.

The invention also relates to a device allowing preparation of an insulating product comprising mineral wool. The device advantageously comprises a means for blowing the insulating product. In this case, the device is a blowing machine. The means for blowing the insulating product comprise a pump and pipes.

Finally, the invention also relates to a thermal insulation method. The spaces that are to be insulated are preferably the floors of roof spaces not suitable for conversion, spaces behind or above suspended ceilings, or cavities of partition walls or hollow walls.

When the device further comprises a means for blowing the insulating product, the method comprises a blowing step. The blowing step is then performed using a blowing machine. The mineral wool is expelled by an outlet pipe using a pump or a turbine.

The aeration step may be performed during the blowing step by adapting the blowing machines. In that case, the turbulent flow can easily be obtained by entrainment of the mineral wool using an air jet. This air jet may be created by a compressed-air source potentially using the pump of the blowing machine.

The insulating product according to the invention is essentially based on expanded wool, preferably mineral wool. In the present description:
wool in the form of non-aerated nodules or flakes is the name given to a wool that has not undergone an aeration step according to the invention,
wool in the form of down or wool in the form of expanded or aerated nodules or flakes is the name given to a wool that has undergone an aeration step according to the invention.

The mineral wool is chosen from glass wool and rock wool.

Nodules or flakes of mineral wool are fibers in bundles rather than individualized fibers like textile glass fibers. These nodules or flakes of mineral wool have a length comprised between 0.05 and 5 cm, in particular between 0.1 and 1 cm. These flakes or nodules are formed of fibers which are entangled in the form of small bundles, small rovings, or "pilling". What is meant in the present description by the length of the flakes or nodules is the length of these bundles in their longest dimension.

Ideally, the mineral wool is expanded enough that the nodules and flakes can no longer be readily distinguished.

When the insulating product comprise glass wool, the flakes or nodules can no longer be distinguished. The insulating product takes the form of down, namely of a product in the form of a layer of discontinuous fibers that remain laid or grouped together in a form similar to a fibrous web in which the fibers are simply entangled (rather than bound) in a loose and fluffy structure. Portions of the down or of the web can be picked up without the volumetric structure being affected.

The glass wool comprises glass fibers. Nodules or flakes of glass wool which are produced by the fiberizing of glass are described for example in patent EP 2 511 586 by means of a device in particular comprising a centrifuge or centrifugal spinner and a basket. A stream of molten glass is fed to the centrifuge and flows out into the basket. The glass wool fibers are formed into nodules in the way explained in FR-A-2 661 687. These glass fibers are entangled.

Glass wool fibers differ from so-called "textile" glass fibers which are obtained by the high-speed mechanical drawing of the molten glass in the form of a sized filament.

The glass wool exhibits, in increasing order of preference, a micronaire value:
less than 20 L/min, less than 15 L/min, less than 12 L/min, less than 10 L/min,
greater than 2 L/min, greater than 3 L/min, greater than 4 L/min, greater than 5 L/min.

The micronaire value is measured in accordance with the method described in document WO-A-03/098209.

The glass fibers of the glass wool are discontinuous. They have a mean diameter preferably less than 2 μm or even less than 1 μm.

The glass wool nodules or flakes are, for example, flakes made of glass wool of the type used for blown-wool insulation, for example of the type of wools marketed by the Saint-Gobain Isover companies under the tradenames Comblissimo® or Kretsull® or by the Certainteed company under the tradename Insulsafe®. These flakes generally have no binder and may contain anti-dust and/or antistatic additives such as oils.

The rock wool comprises rock fibers. The rock wool has a fasonaire value of at least 250. This parameter, which is also referred to as the fineness index, is measured in the way that is conventional in the field of rock wools. The fasonaire value is determined as follows: a test specimen (5 g) made up of a tuft of mineral wool free of oil and binder but which may contain non-fibrous components (nonfibers or "slugs" or "shots") is weighed. This test specimen is compressed to a given volume and has a stream of gas (dry air or nitrogen) kept at a constant flowrate passed through it. The fasonaire value measurement is then the drop in pressure head through the test specimen, evaluated by a water column graduated in conventional units. Conventionally, a fasonaire value result is the mean of the drops in pressure head observed across ten test specimens.

The insulating product comprises, in increasing order of preference, at least 75%, at least 80%, at least 85%, at least 90%, at least 94%, at least 95%, at least 96%, at least 97%, at least 98%, at least 99% wool, preferably mineral wool chosen from glass wool and rock wool, with respect to the total mass of insulating product.

The insulating product comprises, in increasing order of preference, at least 75%, at least 80%, at least 85%, at least 90%, at least 94%, at least 95%, at least 96%, at least 97%, at least 98%, at least 99% of mineral fibers, preferably glass fibers or rock fibers, with respect to the total mass of insulation.

The insulating product comprises, in increasing order of preference, at least 75%, at least 80%, at least 85%, at least 90%, at least 94%, at least 95%, at least 96%, at least 97%, at least 98%, at least 99% of mineral material, with respect to the total mass of insulating product.

EXAMPLES

A glass wool and rock wool, both in the form of non-aerated nodules or flakes, were used in these examples.

Before the aeration step, the glass wool is in the form of nodules or of flakes and comprises glass fibers with a micronaire value of 5.6 L/min. It exhibits a density of 11.6 kg/m$^3$.

Before the aeration step, the rock wool is in the form of nodules or of flakes and comprises rock fibers with a fasonaire value of 250. It exhibits a density of 74 kg/m$^3$.

Figure 5:
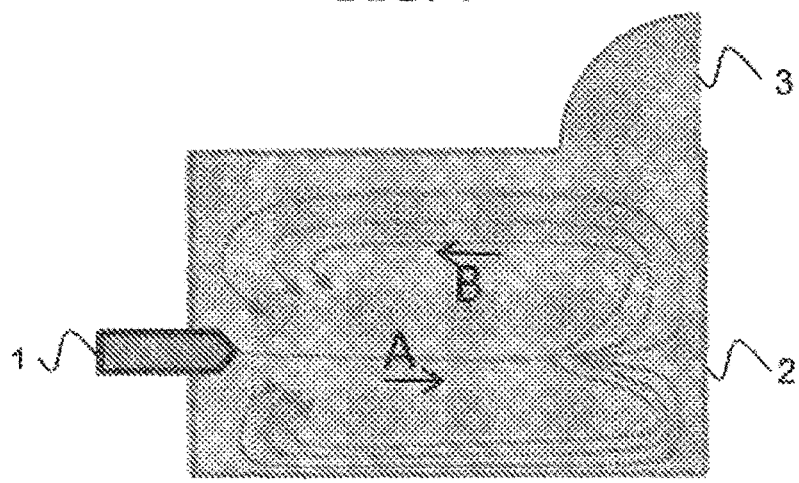
FIG. 5 illustrates a device that makes it possible to perform the aeration according to the invention.

A device that makes it possible to perform the aeration step according to the invention is illustrated in FIG. 5. This device comprises:
- an air injection system 1 generating a first air jet,
- a chamber 2,
- an outlet opening 3.

The dimensions of this device are as follows: 30 cm×30 cm×40 cm with the longest side situated in the direction of the jet.

For the glass wool, the first air jet is a "high-pressure" jet with an inlet pressure of around 4 bar.

For the rock wool, the first air jet is a jet obtained from a blowing machine providing a sufficient inlet pressure.

The mineral wool in the form of nodules or flakes is introduced into the chamber 2. For example, approximately 100 g of glass wool are generally introduced. For rock wool, approximately the same quantity by volume is introduced.

The mineral wool in the form of nodules or flakes is then subjected to a turbulent flow by being entrained in a carrier gas in a direction A with the aid of a first high-pressure air jet generated by the air injection system 1.

The mineral wool is subjected to a flow by entrainment in a carrier gas in a direction B that is the opposite to the direction A so that there is, at least in one plane of the chamber perpendicular to the direction A, mineral wool entrained in the direction A and mineral wool entrained in the direction B.

Entrainment in a carrier gas in a direction B that is opposite to the direction A is the result of the choice of a suitable ratio between the cross section of the first jet and the size of the chamber. When the profile of the mean speeds is represented, there is at least one (for preference) several recirculation points in the chamber where the component of the speed in the direction A is negative, which corresponds to a flow in the opposite sense in the direction B and thus recirculation movements countercurrent to A.

This recirculation zone corresponds to a quantity "q" of mineral wool which at a given moment is going to go back in the countercurrent sense opposite to the direction A and pass the same point at least twice. The streamlines drawn in FIG. 5 suggest that a quantity of mineral wool performs several loops passing through the same point several times.

The dimensions of the chamber are also tailored so that:
- the dimensions perpendicular to the direction of the initial jet are large enough to generate recirculation points in planes of the chamber and
- the dimension parallel to the direction of the jet is small enough to multiply the recirculation movements.

When the mineral wool is sufficiently aerated, the insulating product is expelled from the chamber through the outlet opening 3, either by activation of an opening mechanism or because the chamber has been sized so that the residence time between the mineral wool entering and the outlet opening corresponds to the time needed to achieve the desired degree of homogenization.

In this way there is obtained an insulating product according to the invention comprising:
- glass wool in the form of down, or
- rock wool in the form of down or of expanded nodules or flakes.

This device allows 3 kg of insulating product based on glass wool to be aerated per hour.

The insulating products according to the invention after the aeration step have low densities in particular of around 4 kg/m$^3$ for products based on glass wool and around 50 kg/m$^3$ for products based on rock wool. These products may if necessary undergo a compression step. The compression step may be performed by pressing the product between two plates.

The ratio of the density prior to aeration to the density after aeration is preferably higher than 2, preferably higher than 2.5. Density is very important in blow-in insulating products because it defines the coverage of the product corresponding to the area that can be covered with a given mass of product to a defined depth.

1. Visual and Tomographic Observations

FIGS. 1 and 2 comprise photographs respectively depicting:
- FIG. 1A: a glass wool in the form of nodules or flakes that have not undergone the aeration step according to the invention,
- FIG. 1B: an insulating product comprising loose-fill glass wool in the form of down having undergone the aeration step according to the invention,
- FIG. 2A: a rock wool in the form of nodules or flakes that has not undergone the aeration step according to the invention, and
- FIG. 2B: an insulating product comprising "expanded" rock wool in the form of nodules or flakes which has undergone the aeration step according to the invention.

All the products according to the invention were obtained using the device of FIG. 5.

These photographs show the better homogeneity of the insulating products obtained according to the invention.

Figure 3A:
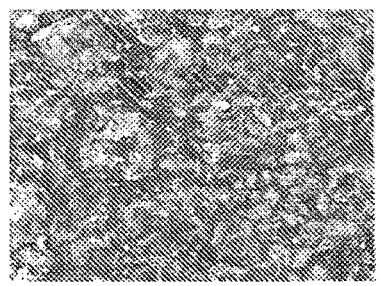
FIG. 3A depicts a glass wool in the form of nodules or flakes that has not undergone the aeration step according to the invention, exhibiting a density of 10 kg/m$^3$.
Figure 3B:
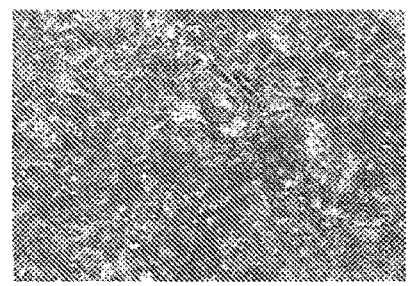
FIG. 3B depicts an insulating product comprising loose-fill glass wool in the form of down which has undergone the aeration step according to the invention and exhibits a density of 4 kg/m$^3$.
Figure 3C:
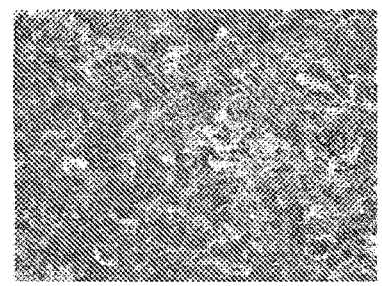
FIG. 3C depicts an insulating product comprising loose-fill glass wool in the form of down having undergone the aeration step according to the invention and a compacting step, and exhibiting a density of 10 kg/m$^3$.

The tomography images in FIG. 3 respectively illustrate:
- FIG. 3A: a glass wool in the form of nodules or flakes that has not undergone the aeration step according to the invention, exhibiting a density of 10 kg/m$^3$,
- FIG. 3B: an insulating product comprising loose-fill glass wool in the form of down which has undergone the aeration step according to the invention and exhibits a density of 4 kg/m$^3$,
- FIG. 3C: an insulating product comprising loose-fill glass wool in the form of down having undergone the aeration step according to the invention and a compacting step, and exhibiting a density of 10 kg/m$^3$.

Figure 4:
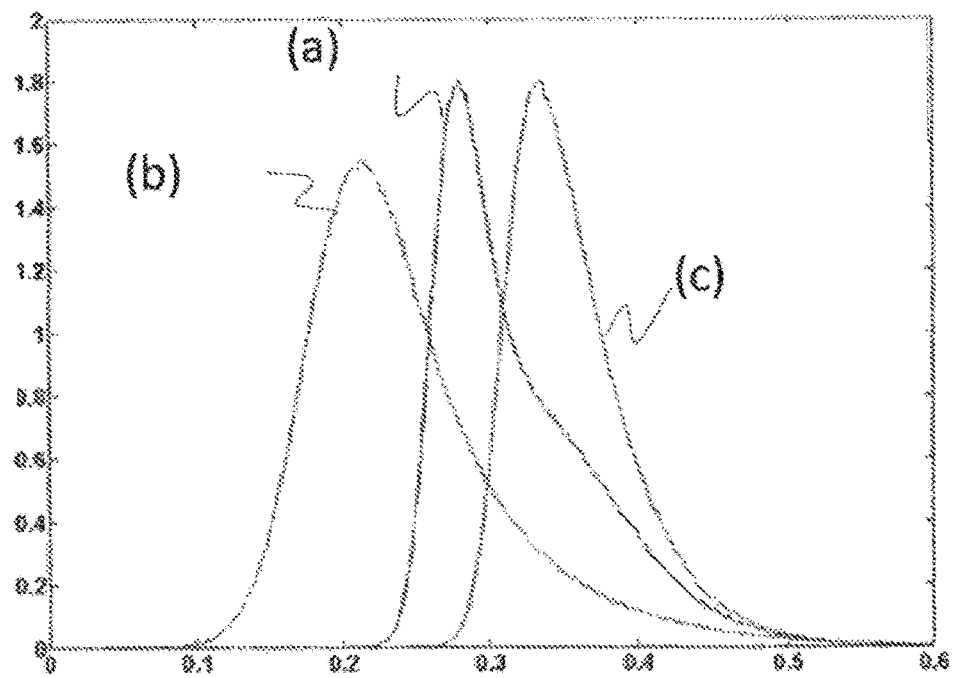
FIG. 4 illustrates graphically the processing of images representing the variations in terms of gray scale by volume.

The processing of these images is illustrated by the graphic in FIG. 4 which represents the variations in terms of gray scale by volume. The abscissa axis plots the intensity and the ordinate axis plots the number of pixels exhibiting this intensity. A point on the curve corresponds to the number of pixels found in the image at a given gray scale level. Curves (a), (b) and (c) respectively correspond to the insulating products of FIGS. 3A, 3B and 3C.

These images and the processing of these images also show the better homogeneity of the insulating products according to the invention. That manifests itself in a better distribution in terms of gray scale levels. The insulating products according to the invention have broader and neargaussian peaks, whereas the non-aerated glass wool has a narrower and asymmetric distribution.

Finally, the insulating product that has undergone a compacting step following the aeration step, illustrated by image 3C, maintains its advantageous properties in terms of homogeneity. It is therefore possible thanks to the invention to obtain homogeneous insulating products of variable densities.

2. Measuring the Thermal Conductivity and Airflow Resistance

The thermal conductivity measurements were taken in insulating products. The thermal conductivity A of a product is the ability of the product to allow a heat flux to pass though it; it is expressed in W/(m·K). The lower this conductivity, the more insulating the product is, and the better the thermal insulation therefore is. The values of thermal conductivity as a function of density were measured in accordance with standard EN14064.

Test specimens of the insulating product were conditioned to stabilize their weight at 23° C. for a relative humidity (RH) of around 50%. The measurements were taken at a mean temperature of 10° C. on an apparatus of R-Matic type on the cases of products measuring 590×590 mm, with a thickness squashed down to a measured 108 mm. The actual measurement zone measures 254×254 mm. The mean thermal conductivity of the insulating products is given in the table below.

The airflow resistance measurements in accordance with standard EN29053 (method A) were taken on the same test specimens as were used for measuring the thermal conductivity.

Several glass wools and one rock wool were used for these tests.

The thermal conductivity and airflow resistance of the test specimens of insulating products defined hereinafter were measured:

PI LV1 NA: insulating product comprising glass wool, type 1, non-aerated,
PI LV1 A insulating product comprising glass wool, type 1, aerated,
PI LV2 NA: insulating product comprising glass wool, type 2, non-aerated,
PI LV2 A: insulating product comprising glass wool, type 2, aerated,
PI LV3 A: insulating product comprising glass wool, type 3, aerated,
PI LV4 A: insulating product comprising glass wool, type 4, aerated,
PI LR NA: insulating product comprising rock wool, non-aerated,
PI LR A: insulating product comprising rock wool, aerated.

Table 1

| Product | Rs (Pa · s/m²) | 590 × 590 density (kg/m3) | 254 × 254 density (kg/m3) | Lambda (mW/(m · K) |
|---|---|---|---|---|
| PI LV1 NA | 590 | 9.3 | 9.6 | 50.7 |
|  | — | 9.5 | 9.6 | 48.9 |
| PI LV1 A | 5762 | 10.2 | 10.2 | 36.8 |
|  | 4990 | 10.1 | 10.1 | 37.1 |
|  | 5988 | 10.0 | 10.0 | 39.4 |
|  | 6034 | 10.0 | 10.0 | 39.8 |
|  | — | 10.1 | 10.1 | 39.8 |
|  | 4990 | 9.9 | 9.9 | 40.4 |
|  | 4310 | 9.7 | 9.7 | 40.7 |
| PI LV2 NA | 1642 | 11.6 | 11.6 | 46.0 |
| PI LV2 A | 1159 | 5.9 | 6.0 | 51.9 |
|  | 5070 | 11.5 | 12.9 | 37.2 |
| PI LV3 A | 628 | 4.1 | 4.1 | 59.3 |
|  | 5311 | 10.2 | 12.0 | 36.8 |
|  | 6132 | 10.1 | 11.5 | 37.1 |
| PI LV4 A | — | 10.1 | 9.8 | 39.8 |
|  | 6374 | 10.0 | 9.6 | 39.8 |
|  | 6422 | 10.0 | 9.9 | 39.4 |
|  | 5311 | 9.9 | 9.7 | 40.4 |
|  | 4587 | 9.7 | 9.8 | 40.7 |
|  | 435 | 2.9 | 3.0 | 78.9 |
|  | 44615 | 29.5 | 31.2 | 31.6 |
| PI LR NA | 5794 | 72.5 | 74.2 | 38.2 |
| PI LR A | 3525 | 39.1 | 43.0 | 39.1 |
|  | 18638 | 64.8 | 71.3 | 35.8 |

In terms of performance, the insulating products according to the invention obtained after the aeration step have a thermal conductivity which is significantly lower.

The insulating products based on glass wool according to the invention all have a thermal conductivity far below 42 mW·m⁻¹·K⁻¹ or even below 41 mW·m⁻¹·K⁻¹ for densities comprised between 9.5 and 10.5 kg/m³.

An insulating product comprising aerated glass wool exhibits an improvement in thermal conductivity of more than 15%, preferably more than 20%, by comparison with an insulating product comprising non-aerated glass wool for the same density. For a given performance, only half as much glass wool is needed in order to obtain the same thermal resistance.

Effectively, the glass wool in the form of non-aerated nodules or flakes exhibits, for a density of 10 kg/m³, a thermal conductivity of around 53 mW·m⁻¹·K⁻¹.

The insulating product according to the invention exhibits, for the same density, a thermal conductivity of around 37 mW·m⁻¹·K⁻¹. That corresponds to a reduction of 16 mW·m⁻¹·K⁻¹ and a 30% increase in thermal resistance for the same blown thickness.

The insulating product according to the invention exhibits, for the same thermal conductivity, a density of 4.8 kg/m³. That corresponds to a reduction of 5.2 kg/m³, representing a material saving of 52%.

II. Alternative Forms of Embodiment

Figure 6A:
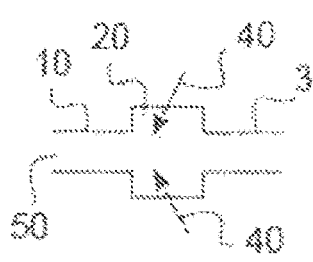
FIG. 6A depicts an exemplary variation of recirculation generated by high pressure jets.

FIG. 6 illustrates three alternative forms of embodiment which may notably be adapted to blowing machines.

Each of these devices comprises:
a chamber in which the aeration step is performed, and
at least one means capable of generating a turbulent flow within the chamber.

Figure 6B:
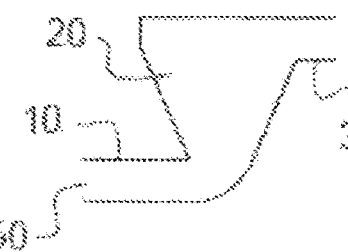
FIG. 6B deptics an exemplary further variation of recirculation generated by high pressure jets and by adapting the geometry of an inventive device.
Figure 6C:
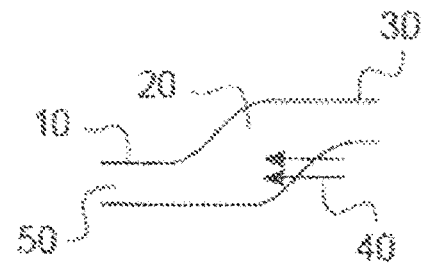
FIG. 6C depicts an exemplary recirculation generated by adapting the geometry of an inventive device.

The mineral wool in the form of nodules or flakes is subjected to a turbulent flow by entrainment in a carrier gas in a direction A using a first high-pressure air jet. It arrives in the chamber 20 via a pipe 10 at an inlet orifice 50. The recirculation may be generated by high-pressure jets 40 (FIGS. 6A and 6C) and/or by adapting the geometry of the device (FIGS. 6B and 6C).

Each of these devices therefore comprises a means capable of generating a flow by entrainment in a carrier gas in a direction B that is the opposite to the direction A so that there is, at least in one plane of the chamber perpendicular to the direction A, mineral wool entrained in the direction A and mineral wool entrained in the direction B.

The devices 6.A and 6.C both comprise additional air jets 40 of which the direction of spraying in a plane of the chamber perpendicular to the direction A is at least in part the opposite of the direction A. This or these additional air jets enter the chamber from injection nozzles, preferably cylindrical.

The devices 6.B and 6.C both comprise a chamber having dimensions and a cross section for the inlet orifice 50 that allow and/or contribute to the entrainment in a carrier gas in a direction B that is the opposite to the direction A. The ratio between the cross section of the inlet orifice 50 and a cross section of the chamber in a plane of the chamber perpendicular to the direction A is adapted so as to generate recirculation points.

The insulating product according to the invention emerges via an outlet pipe 30.

Figure 7:
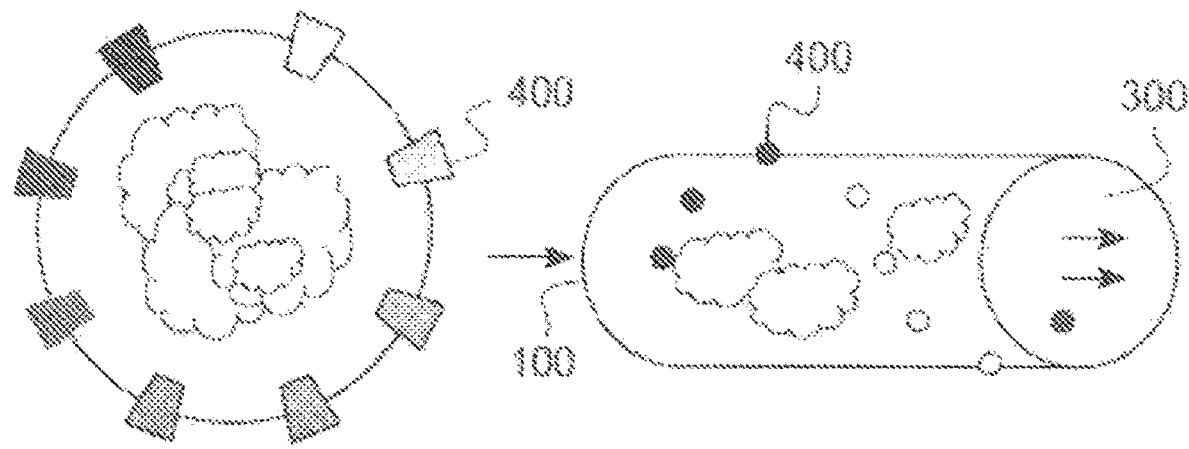
FIG. 7 illustrates an alternative form of embodiment that can be adapted to any pipe or duct.

FIG. 7 illustrates an alternative form of embodiment that can be adapted to any pipe or duct and, in particular:
to a conveying pipe used to carry mineral wool in the form of flakes or nodules, for example at a factory,
to a pipe of a blowing machine.

This device comprises a high-pressure air jet ring on the passage of the glass wool. FIG. 7 illustrates part of a pipe or duct that acts as a chamber comprising an inlet 100, an outlet 300 and several additional air jets the inlet orifices 400 of which are situated directly on part of the pipe. The air of the additional jets is preferably injected at high pressure.

This device comprises additional air jets 400 of which the direction of spraying in a plane of the chamber perpendicular to the direction A is perpendicular to the direction A. This or these additional air jets enter the chamber from injection nozzles, preferably cylindrical.

Figure 8:
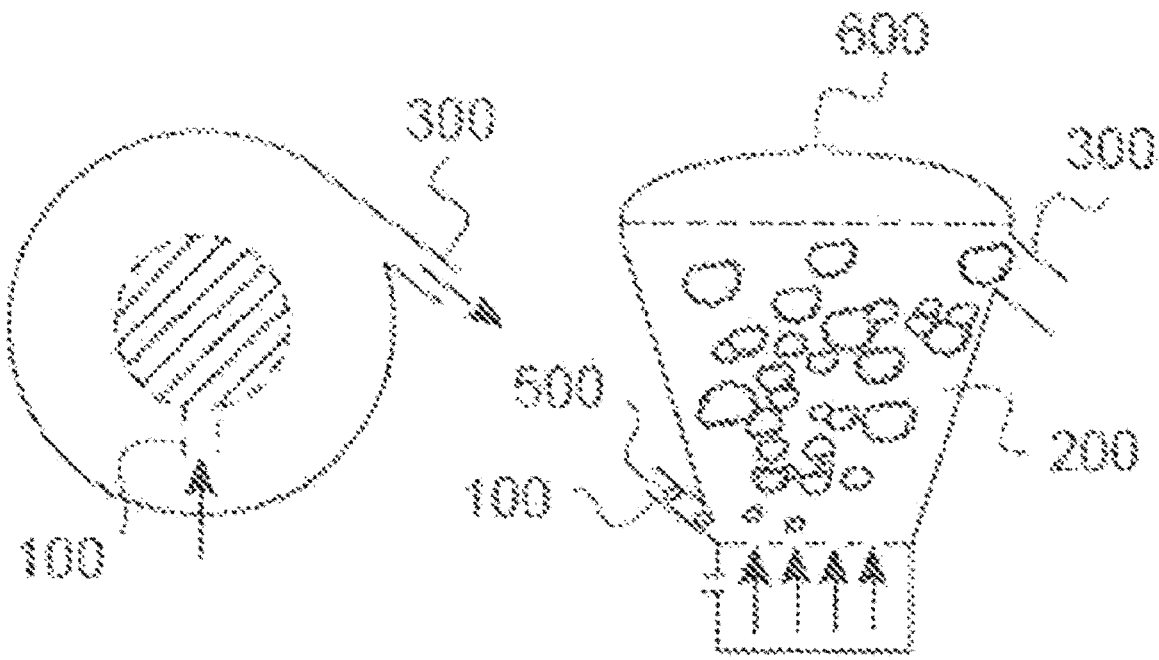
FIG. 8 illustrates an alternative form of embodiment comparable with a fluidized bed.

FIG. 8 illustrates another alternative form of embodiment comparable with a fluidized bed. This device comprises a means of admitting mineral wool in the form of nodules or flakes 100, a chamber in which the aeration step takes place 200, an insulating product outlet means 300, an air inlet 500 and an air outlet 600. It is possible to improve the turbulent conditions or to optimize the time spent in the chamber by the addition of air inlets such as air jets or mechanical obstacles in the chamber 200. This device can easily be added to a mineral wool manufacturing line. It could for example be coupled to another pneumatic system, in particular prior to a step of separating air and fibers.

The invention claimed is:

1. A method for preparing a wool-comprising insulating product, the method comprising:
aerating inside a device, the device comprising a chamber and a turbulent gaseous flow generator,
wherein the aerating comprises introducing a stream of carrier gas into the chamber and subjecting a wool in nodule or flake form to a turbulent gaseous flow of the carrier gas, with entrainment of the wool in the turbulent gaseous flow in a direction A and in a direction B, the direction B being opposite to the direction A, such that within the chamber, there is at least one plane perpendicular to the direction A, in which wool entrained in the direction A crosses wool entrained in the direction B, and
wherein the turbulent gaseous flow comprises a first turbulent gaseous flow in the direction A and a second turbulent gaseous flow in the direction B.

2. The method of claim 1, wherein the wool is a mineral wool.

3. The method of claim 1, wherein the turbulent gaseous flow further comprises a recirculation zone, and
wherein, in the recirculation zone, the first turbulent gaseous flow in the direction A reverses direction, thereby generating the second turbulent gaseous flow in the direction B.

4. The method of claim 3, wherein the recirculation zone comprises a recirculation point wherein the first turbulent gaseous flow forms the second turbulent gaseous flow, and
wherein a first portion of the wool entrained in the first turbulent gaseous flow travels through a shear zone in the chamber.

5. The method of claim 3, wherein the first turbulent gaseous flow in the direction A is obtained by entraining the wool using a first air jet.

6. The method of claim 5, wherein the turbulent gaseous flow generator comprises an inlet orifice,
wherein the first air jet enters the chamber from the inlet orifice, and
wherein flow of the first air jet at a level of the inlet orifice has a Reynolds number higher than 3000.

7. The method of claim 6, wherein the entrainment in a carrier gas in the direction B is obtained by choosing a suitable ratio between dimensions of a first cross-section of the inlet orifice and a second cross-section of the chamber in a plane of the chamber perpendicular to the direction A.

8. The method of claim 7, wherein the aerating inside the chamber is performed for a duration longer than 10 seconds.

9. The method of claim 5, wherein the entrainment in the carrier gas in the direction B is obtained by at least one additional air jet at least partially injecting air in an opposite direction to or perpendicular to the direction A.

10. The method of claim 9, wherein the at least one additional air jet enters the chamber from one or more inlet orifices, and
wherein flow from the at least one additional air jet at the one or more inlet orifices has a Reynolds number higher than 3000.

11. The method of claim 10, wherein the Reynolds number of the at least one additional air jet is higher than the Reynolds number of the first air jet which carries the wool in the direction A.

12. The method of claim 11, wherein a ratio between a speed of the at least one additional air jet and a mean speed of the turbulent gaseous flow that carries the wool in the direction A is greater than 1.

13. The method of claim 9, wherein a speed of the at least one additional air jet is higher than a mean speed of the turbulent gaseous flow that carries the wool in the direction A.

14. The method of claim 1, wherein the turbulent gaseous flow generator comprises an inlet orifice, and the method further comprises:
forming the turbulent gaseous flow by introducing the carrier gas through the inlet orifice, and
wherein flow through the inlet orifice has a Reynolds number higher than 3000.

15. The method of claim 1, wherein the chamber comprises a cross-section Se and a length L, both perpendicular to the direction A,
wherein dimensions of the cross-section Se perpendicular to the direction A are sufficient to generate a recirculation point in a plane of the chamber, and
wherein the length L is short enough that recirculation movements are created.

16. The method of claim 1, wherein a mean speed of the turbulent gaseous flow which carries the wool in the direction A is in a range of from 0.5 to 50 m/s.

17. The method of claim 1, wherein the chamber is part of a duct or of a pipe.

18. The method of claim 1, further comprising:
melting raw materials, in a melting furnace;
fiberizing a first precursor of the wool; forming a mat of the wool;
nodulating a second precursor of the wool using grinding;
coating the wool, optionally in the nodule or flake form, with one or more agents; and/or
bagging the wool, optionally in the nodule or flake form.

19. The method of claim 18, comprising the nodulating and bagging,
wherein the aerating is performed after the nodulating and before the bagging.

20. The method of claim 18, comprising the bagging,
wherein the aerating is performed after the bagging.

* * * * *